United States Patent
Yang et al.

(10) Patent No.: US 11,265,854 B2
(45) Date of Patent: Mar. 1, 2022

(54) COLLISION HANDLING FOR PHYSICAL UPLINK CHANNEL REPETITION

(71) Applicant: QUALCOMM Incorporated, San Diego, CA (US)

(72) Inventors: Wei Yang, San Diego, CA (US); Yi Huang, San Diego, CA (US); Wanshi Chen, San Diego, CA (US); Renqiu Wang, San Diego, CA (US); Seyong Park, San Diego, CA (US); Gokul Sridharan, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/546,078

(22) Filed: Aug. 20, 2019

(65) Prior Publication Data
US 2020/0068558 A1  Feb. 27, 2020

Related U.S. Application Data

(60) Provisional application No. 62/720,755, filed on Aug. 21, 2018.

(51) Int. Cl.
*H04W 72/04* (2009.01)
*H04W 72/10* (2009.01)

(52) U.S. Cl.
CPC ... *H04W 72/0413* (2013.01); *H04W 72/0446* (2013.01); *H04W 72/10* (2013.01)

(58) Field of Classification Search
CPC ...... H04L 5/007; H04L 5/0048; H04L 5/0053; H04L 5/0055; H04L 5/0057;
(Continued)

(56) References Cited

U.S. PATENT DOCUMENTS

2015/0271765 A1* 9/2015 Hakola ................ H04W 52/34
370/329
2019/0037586 A1* 1/2019 Park ...................... H04L 1/0073
(Continued)

OTHER PUBLICATIONS

Huawei et al., "Discussion on Partial Overlap between PUCCHs", 3GPP Draft; R1-1804427, 3rd Partnership Project (3GPP), Mobile Competence Centre, 650, Route Des Lucioles, F-06921 Sophia Antipolis Cedex, France, vol. RAN WG1, No. Sanya. China; Apr. 16, 2018-Apr. 20, 2018 Apr. 15, 2018, XP051426709, Retrieved from the Internet: URL:http://www.3gpp.org/ftp/Meetings%5F3GPP%5FSYNC/RAN1/Docs/ [retrieved on Apr. 15, 2018], figures 1-12, sections 1-5, 9 pages.

(Continued)

*Primary Examiner* — Khaled M Kassim
(74) *Attorney, Agent, or Firm* — Qualcomm Incorporated

(57) ABSTRACT

Various aspects of the present disclosure generally relate to wireless communication. In some aspects, a user equipment (UE) may identify one or more time slots in which a first communication on a multi-slot physical uplink control channel (PUCCH) overlaps with a second communication on another PUCCH. The UE may transmit, for each time slot of the one or more time slots, the first communication or the second communication based at least in part on a first priority assigned to the multi-slot PUCCH and a second priority assigned to the other PUCCH. Numerous other aspects are provided.

23 Claims, 11 Drawing Sheets

(58) Field of Classification Search
CPC .............. H04L 5/0064; H04L 5/0091; H04W 72/0413; H04W 72/0446; H04W 72/10; H04W 72/1242; H04W 72/1268; H04W 72/1284

See application file for complete search history.

(56) References Cited

U.S. PATENT DOCUMENTS

| | | | | |
|---|---|---|---|---|
| 2019/0230683 A1* | 7/2019 | Akkarakaran | ........ | H04L 5/0044 |
| 2019/0246416 A1* | 8/2019 | Park | ................. | H04W 72/1278 |
| 2019/0306922 A1* | 10/2019 | Xiong | ................. | H04L 1/1664 |
| 2019/0306923 A1* | 10/2019 | Xiong | ................. | H04W 72/042 |
| 2019/0380124 A1* | 12/2019 | Kim | ................. | H04L 5/0048 |
| 2020/0007296 A1* | 1/2020 | Papasakellariou | .. | H04W 72/044 |
| 2020/0022160 A1* | 1/2020 | Zou | ................. | H04W 72/1242 |
| 2020/0022161 A1* | 1/2020 | Yang | ................. | H04W 72/0413 |
| 2020/0036473 A1* | 1/2020 | Nemeth | ................. | H04L 1/203 |
| 2020/0068599 A1* | 2/2020 | Yang | ................. | H04W 72/1268 |
| 2020/0196343 A1* | 6/2020 | Marinier | ................. | H04L 1/1854 |
| 2021/0014857 A1* | 1/2021 | Lin | ................. | H04W 72/1284 |

OTHER PUBLICATIONS

International Search Report and Written Opinion—PCT/US2019/047509—ISA/EPO—dated Oct. 31, 2019.

Qualcomm Incorporated: "Summary of Remaining Issues for UCI Multiplexing on PUSCH", 3GPP Draft; R1-1805666 Summary of Remaining Issues for UCI Multiplexing on PUSCH—Version 5, 3rd Generation Partnership Project (3GPP), Mobile Competence Centre, 650, Route Des Lucioles, F-06921 Sophia-Antipolis Cedex, France, vol. RAN WG1, No. Sanya, China; Apr. 16, 2018-Apr. 20, 2018 Apr. 19, 2018, XP051427793, Retrieved from the Internet: URL:http://www.3gpp.org/ftp/Meetings%5F3GPP%5FSYNC/RAN1/Docs [retrieved on Apr. 19, 2018], 10 pages.

* cited by examiner

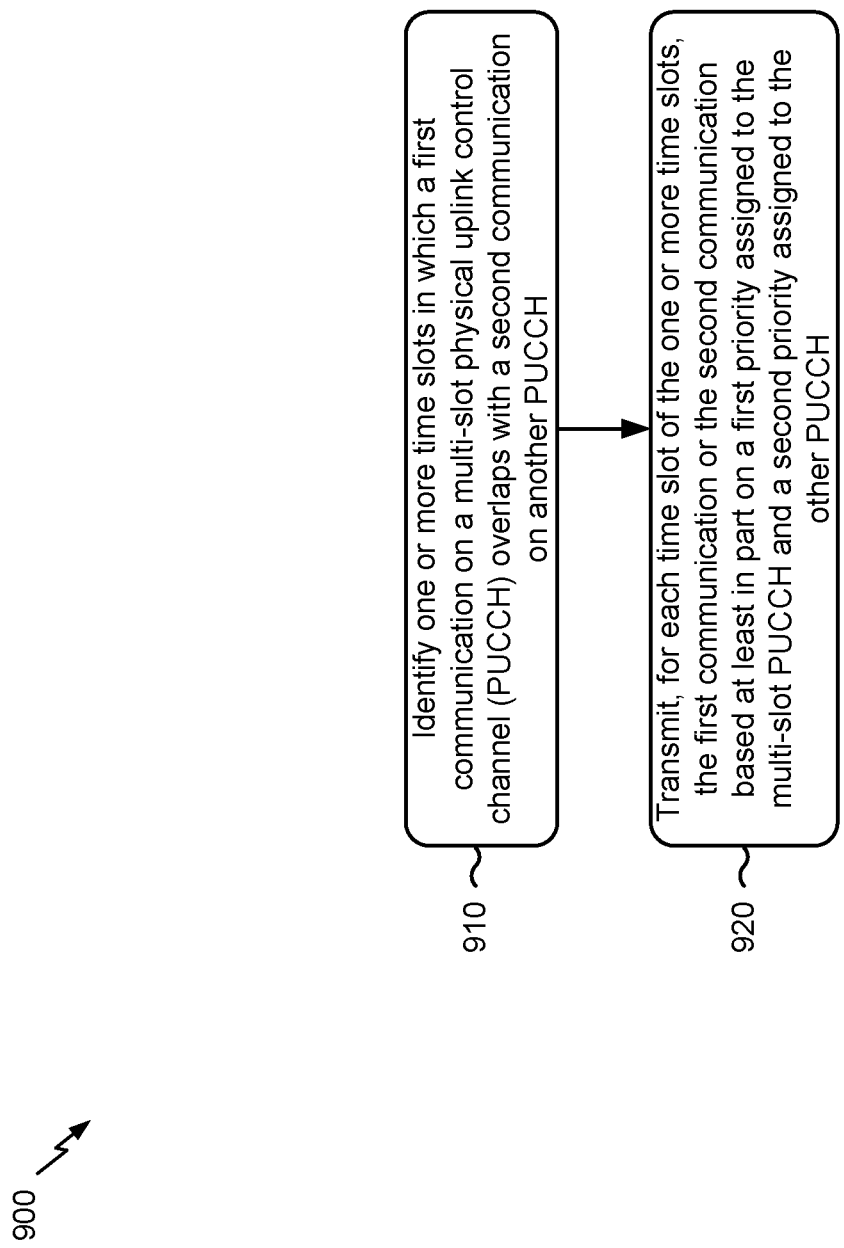

COLLISION HANDLING FOR PHYSICAL UPLINK CHANNEL REPETITION

CROSS-REFERENCE TO RELATED APPLICATION

This application claims priority to Provisional Patent Application No. 62/720,755, filed on Aug. 21, 2018, entitled "COLLISION HANDLING FOR PHYSICAL UPLINK CHANNEL REPETITION," which is hereby expressly incorporated by reference herein.

FIELD OF THE DISCLOSURE

Aspects of the present disclosure generally relate to wireless communication, and to techniques and apparatuses for collision handling for physical uplink channel repetition.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include identifying one or more time slots in which a first communication on a multi-slot physical uplink control channel (PUCCH) overlaps with a second communication on another PUCCH; and transmitting, for each time slot of the one or more time slots, the first communication or the second communication based at least in part on a first priority assigned to the multi-slot PUCCH and a second priority assigned to the other PUCCH.

In some aspects, a UE for wireless communication may include memory and one or more processors operatively coupled to the memory. The memory and the one or more processors may be configured to identify one or more time slots in which a first communication on a multi-slot PUCCH overlaps with a second communication on another PUCCH; and transmit, for each time slot of the one or more time slots, the first communication or the second communication based at least in part on a first priority assigned to the multi-slot PUCCH and a second priority assigned to the other PUCCH.

In some aspects, a non-transitory computer-readable medium may store one or more instructions for wireless communication. The one or more instructions, when executed by one or more processors of a UE, may cause the one or more processors to identify one or more time slots in which a first communication on a multi-slot PUCCH overlaps with a second communication on another PUCCH; and transmit, for each time slot of the one or more time slots, the first communication or the second communication based at least in part on a first priority assigned to the multi-slot PUCCH and a second priority assigned to the other PUCCH.

In some aspects, an apparatus for wireless communication may include means for identifying one or more time slots in which a first communication on a multi-slot PUCCH overlaps with a second communication on another PUCCH; and means for transmitting, for each time slot of the one or more time slots, the first communication or the second communication based at least in part on a first priority assigned to the multi-slot PUCCH and a second priority assigned to the other PUCCH.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a diagram illustrating an example process performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
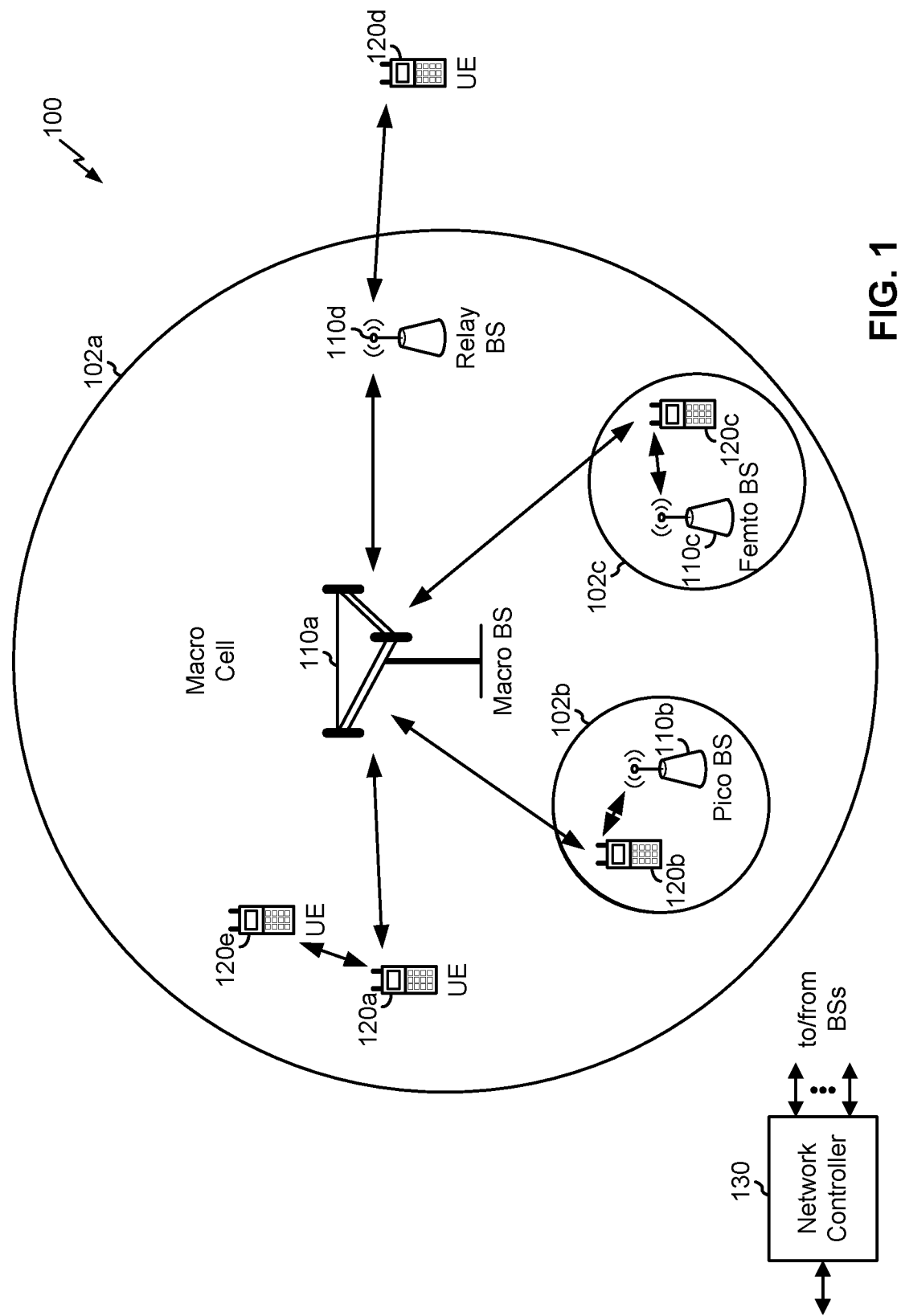
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
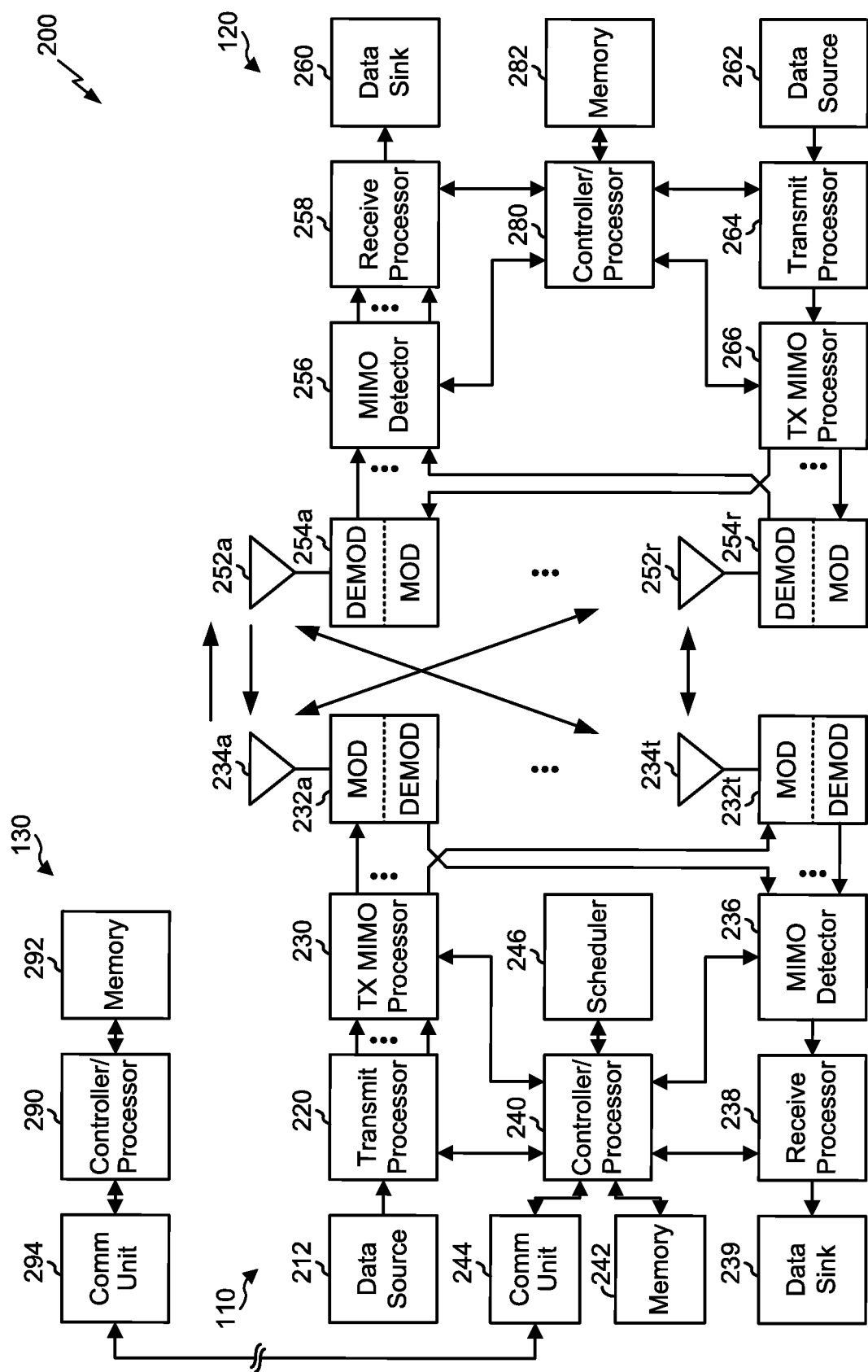
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with collision handling for physical uplink channel repetition, as described in more detail elsewhere herein. For example, controller/processor 240 of base station 110, controller/processor 280 of UE 120, and/or any other component(s) of FIG. 2 may perform or direct operations of, for example, process 900 of FIG. 9, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for identifying one or more time slots in which a first communication on a multi-slot physical uplink control channel (PUCCH) overlaps with a second communication on another PUCCH, means for transmitting, for each time slot of the one or more time slots, the first communication or the second communication based at least in part on a first priority assigned to the multi-slot PUCCH and a second priority assigned to the other PUCCH, and/or the like. In some aspects, such means may include one or more components of UE 120 described in connection with FIG. 2.

As indicated above, FIG. 2 is provided merely as an example. Other examples may differ from what is described with regard to FIG. 2.

Figure 3A:
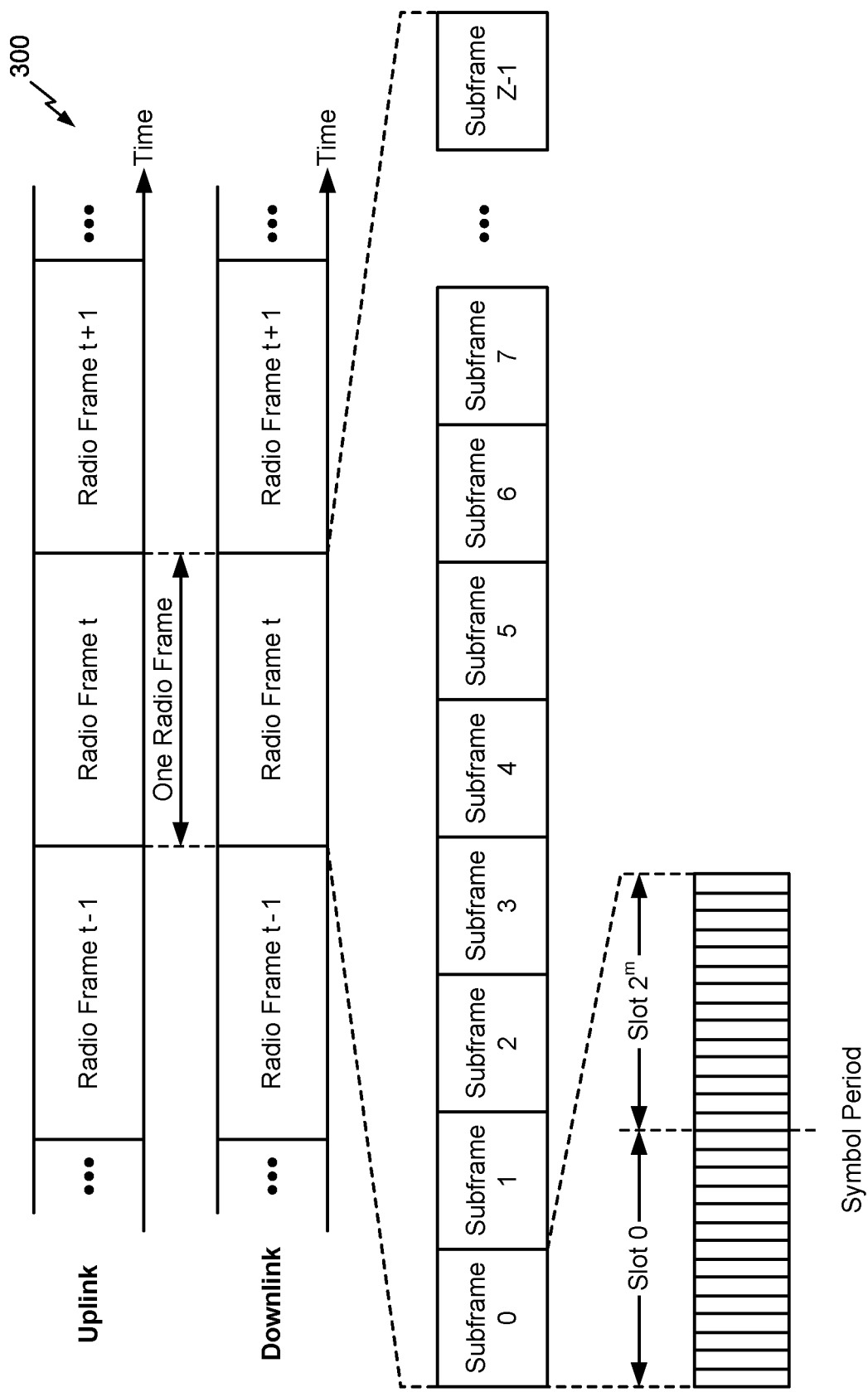
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z ($Z \geq 1$) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
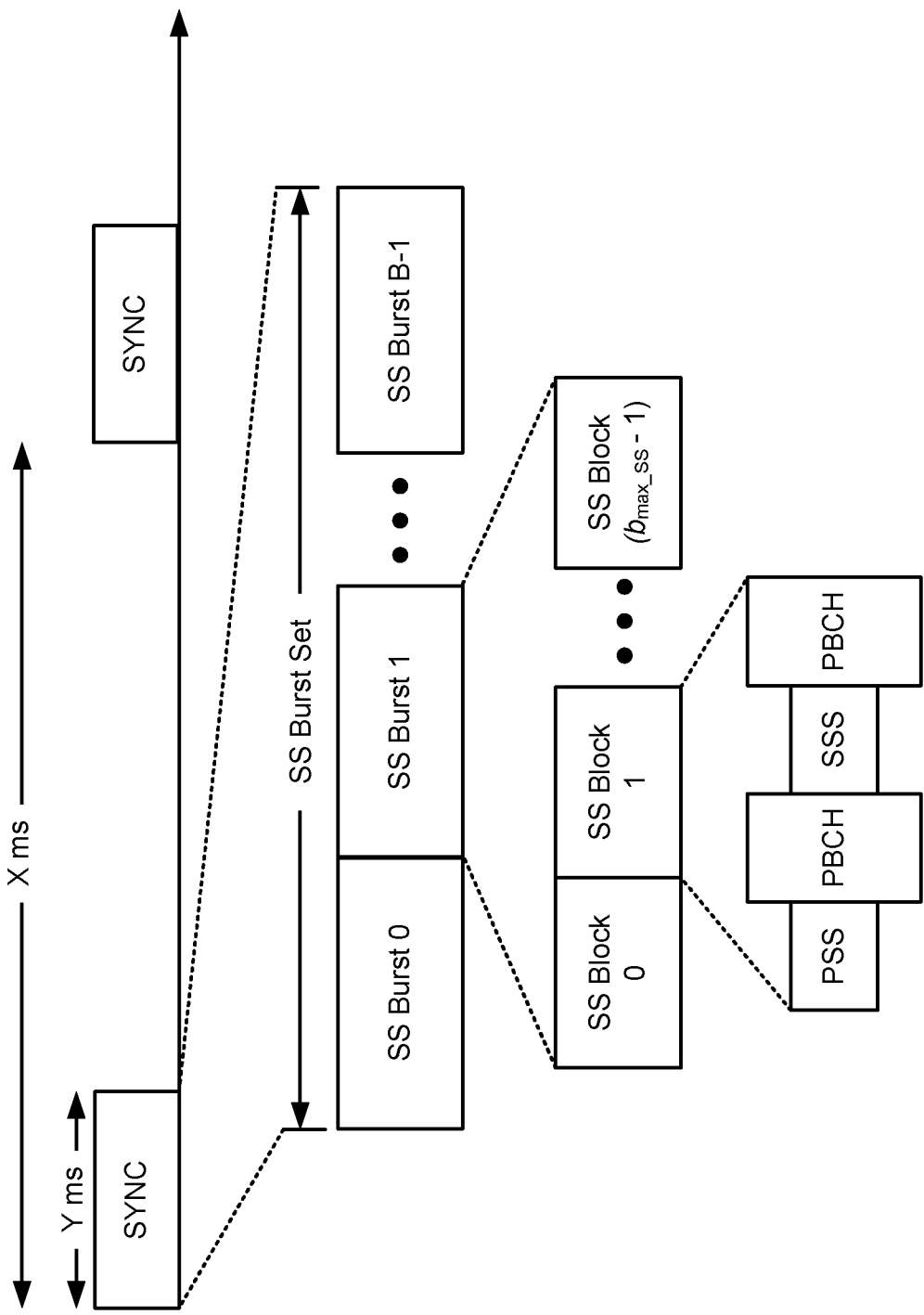
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_ss}-1$), where $b_{max\_ss}-1$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
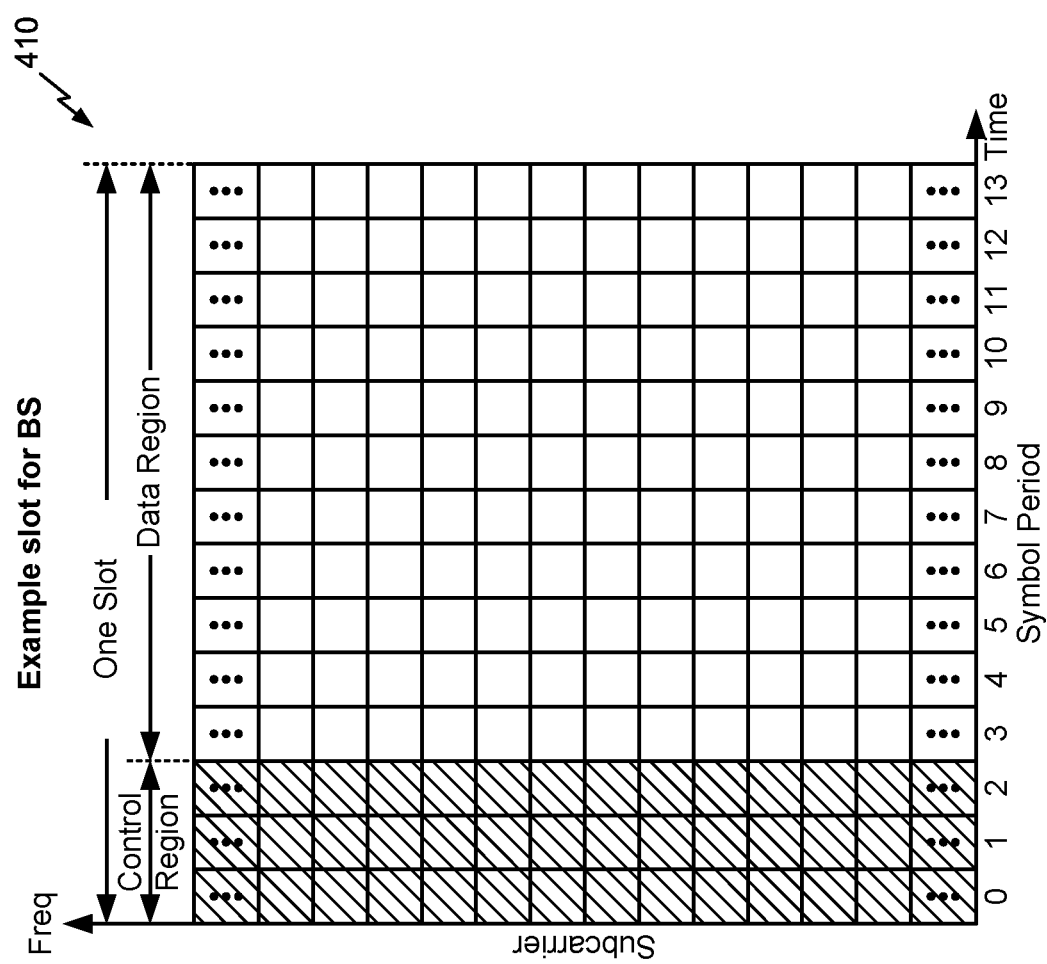
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
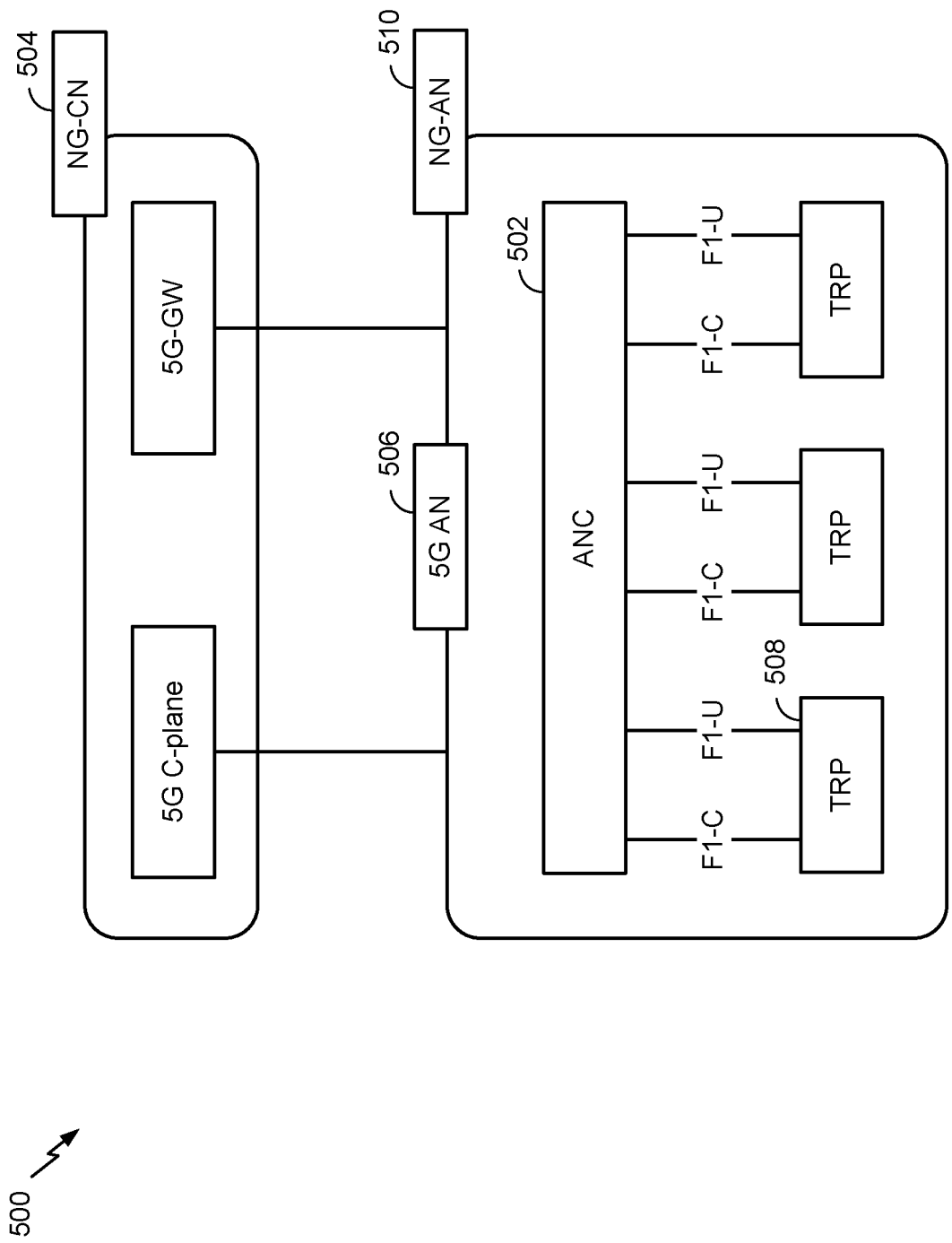
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
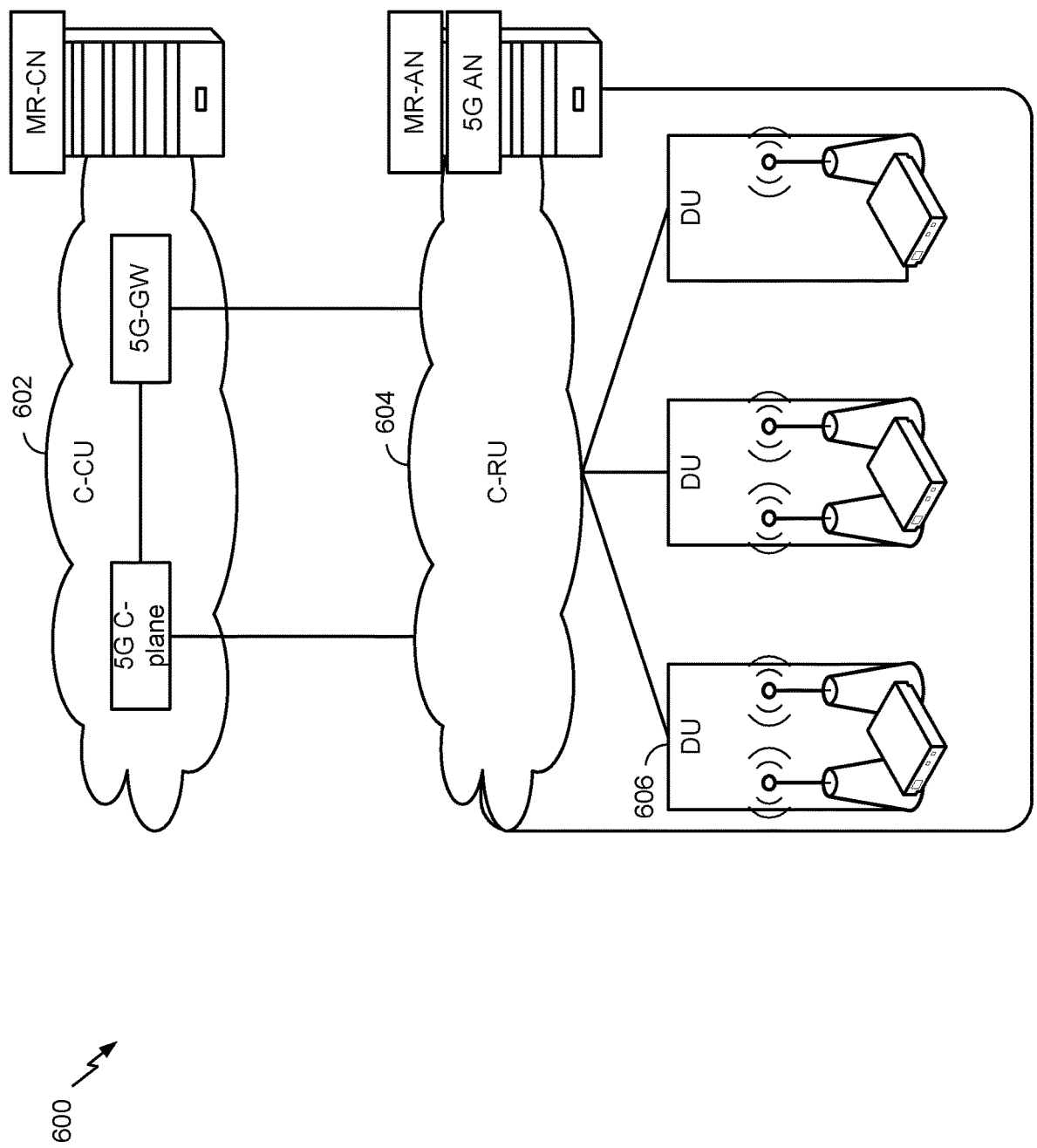
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

In some communications systems, such as 5G or NR, a UE may transmit a communication to a BS on a physical uplink channel (e.g., a PUCCH, a physical uplink shared channel (PUSCH), and/or the like) in one or more time slots. In some cases, a plurality of communications may be scheduled (e.g., by the BS, by the UE, by another entity in the communications system, and/or the like) to be transmitted by the UE in the same time slot. For example, a first communication may be scheduled to be transmitted by the UE in the time slot on a first PUCCH, and a second communication may be scheduled to be transmitted by the UE in the time slot on a second PUCCH.

In some cases, the scheduling of a plurality of communications for transmission by the UE in the same time slot on different physical uplink channels may be referred to as a collision. In some cases, the UE may be configured to apply a complex set of rules to resolve the collision. However, the UE may be unable to resolve a scenario where one or more of the physical uplink channels are used to transmit a communication a plurality of times across a plurality of time slots (which may be referred to as transmission repetition).

Some aspects described herein provide techniques and apparatuses for collision handling for physical uplink channel repetition. In some aspects, a UE may identify one or more time slots in which a first communication on a multi-slot PUCCH (e.g., a communication to be transmitted in a plurality of time slots on the multi-slot PUCCH) overlaps with a second communication on another PUCCH. The UE may, for each time slot of the one or more time slots, transmit the first communication or the second communication based at least in part on a first priority assigned to the multi-slot PUCCH and a second priority assigned to the other PUCCH. In this way, the UE is capable of resolving a collision between the multi-slot PUCCH and other PUCCHs (e.g., a single-slot PUCCH, another multi-slot PUCCH), which increases the reliability of the UE, increases the operability of the UE, and/or the like.

Figure 7:
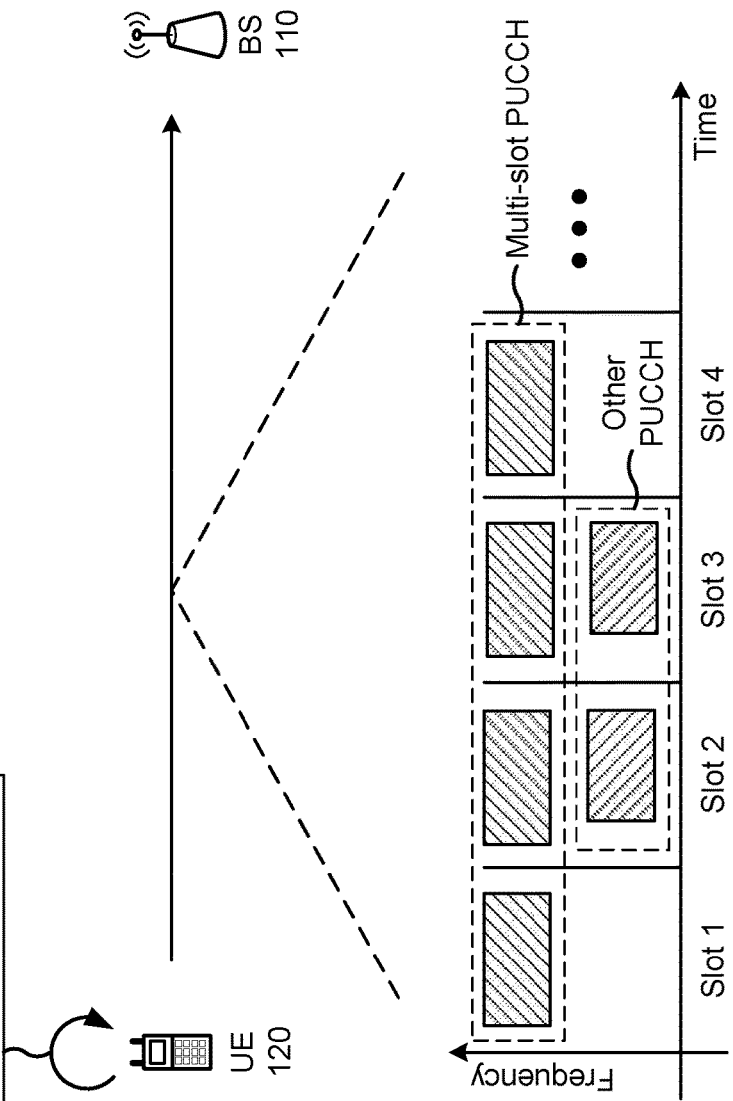
FIG. 7 is a diagram illustrating an example of collision handling for physical uplink channel repetition, in accordance with various aspects of the present disclosure.

FIG. 7 is a diagram illustrating an example 700 of collision handling for physical uplink channel repetition, in accordance with various aspects of the present disclosure. As shown in FIG. 7, example 700 includes a BS 110 and a UE 120. In some aspects, BS 110 and UE 120 may be included in a communications system.

In some aspects, UE 120 may be configured to transmit communications to BS 110 and/or other entities included in the communications system. UE 120 may transmit the communications on one or more physical uplink channels, such as a PUCCH, a PUSCH, and/or the like. In some aspects, UE 120 may transmit a communication at a particular frequency and in one or more time slots. A physical uplink channel that is configured to transmit a communication with repetition (e.g., the communication is to be transmitted in a plurality of time slots on the physical uplink channel) may be referred to as a multi-slot physical uplink channel, and a physical uplink channel that is configured to transmit a communication without repetition may be referred to as a single-slot physical uplink channel.

In some aspects, UE 120 may receive a scheduling grant (e.g., from BS 110, from another entity in the communications system, and/or the like) for transmitting a communication on a physical uplink channel to BS 110, and may generate the communication based on receiving the scheduling grant. In some aspects, UE 120 may receive scheduling grants that result in a collision in one or more time slots on the uplink between UE 120 and BS 110. For example, UE 120 may receive a first scheduling grant to transmit a first communication with repetition in a plurality of time slots (e.g., Slot 1 through Slot 4) on a multi-slot PUCCH, and may receive a second scheduling grant to transmit a second communication in one or more of Slot 1 through Slot 4 on another PUCCH. In example 700 illustrated in FIG. 7, the second scheduling grant may indicate the UE for transmitting the second communication with repetition on the other PUCCH in Slot 2 and Slot 3. However, the second communication may be transmitted without repetition on a single-slot PUCCH, as well as other configurations for the second communication. Moreover, in some aspects, UE 120 may receive three or more scheduling grants to transmit three or more communications in the same time slot.

As shown in FIG. 7, and as shown by reference number 702, UE 120 may identify one or more time slots in which the first communication on the multi-slot PUCCH overlaps with the second communication on another PUCCH. In some aspects, UE 120 may identify the one or more time slots based at least in part on determining that the multi-slot PUCCH is scheduled to be transmitted by UE 120. In some aspects, UE 120 may identify the one or more time slots by identifying that the first communication and the second communication overlap, in each of the one or more time slots, by at least one orthogonal frequency division multiplexing (OFDM) symbol.

In some aspects, UE 120 may determine that the first communication and the second communication are to be transmitted in the same one or more time slots, may determine that the first communication is a first hybrid automatic repeat request acknowledgement (HARQ-ACK), and may determine that the second communication is a second hybrid automatic repeat request acknowledgement (HARQ-ACK). In this case, UE 120 may determine that a scheduling error has occurred based at least in part on two HARQ-ACK communications being scheduled to be transmitted in the same one or more time slots (e.g., based on the configuration of the communications system). Accordingly, UE 120 may resolve the collision between the two HARQ-ACK/communications based on a UE-specific configuration, which may be different for different UE and/or component part vendors. This may occur even where the first communication and the second communication do not overlap within the same one or more time slots (e.g., where the first communication and the second communication do not overlap in any of the OFDM symbols included in the one or more time slots).

As further shown in FIG. 7, and as shown by reference number 704, UE 120 may determine whether to transmit the first communication or the second communication to resolve the collision between the first communication and the second communication in the one or more time slots (e.g., Slot 2 and Slot 3). In some aspects, UE 120 may determine whether to transmit the first communication or the second communication based on a first priority assigned to the multi-slot PUCCH and a second priority assigned to the other PUCCH.

In some aspects, UE 120 may determine the first priority and the second priority based at least in part on various factors associated with the communications system, based at least in part on various factors associated with BS 110, based at least in part on various factors associated with UE 120, based at least in part on various factors associated with the multi-slot PUCCH and the other PUCCH, and/or the like. For example, UE 120 may determine the first priority and the second priority based at least in part on a service type associated with the multi-slot PUCCH and the other PUCCH, an uplink control information (UCI) type associated with the multi-slot PUCCH and the other PUCCH, a channel state information (CSI) report priority assigned to the multi-slot PUCCH and the other PUCCH, and/or the like.

In some aspects, the service type associated with the multi-slot PUCCH and/or the other PUCCH may include an ultra reliable low latency communications (URLLC) service type, an enhanced mobile broadband (eMBB) service type, a massive machine type communications (MMTC) service type, and/or the like. For example, the URLLC service type may be a greater priority relative to the eMBB service type. As another example, the eMBB service type may be a greater priority relative to the MMTC service type. In some aspects, an operator of the communications system may specify the priorities of the various service types.

In some aspects, the UCI type associated with the multi-slot PUCCH and/or the other PUCCH may include a HARQ-ACK UCI type, a scheduling request (SR) UCI type, a channel state information (CSI) report UCI type, and/or the like. For example, the HARQ-ACK UCI type may be a greater priority relative to the SR UCI type and the CSI report UCI type. As another example, the SR UCI type may be a greater priority relative to the CSI report UCI type. In some aspects, an operator of the communications system may specify the priorities of the various UCI types.

In some aspects, UE 120 may transmit the first communication or the second communication (e.g., may transmit the first communication and refrain from transmitting the second communication or may transmit the second communication and refrain from transmitting the first communication) in the one or more time slots (e.g., Slot 2 and Slot 3) based at least in part on whether the first priority is greater relative to the second priority and/or whether the second priority is greater relative to the first priority. For example, UE 120 may determine that the first priority assigned to the multi-slot PUCCH is greater relative to the second priority assigned to the other PUCCH, and accordingly may transmit the first communication (and may refrain from transmitting the second communication) in the one or more time slots (e.g., Slot 2 and Slot 3) based at least in part on determining that the first priority assigned to the multi-slot PUCCH is greater relative to the second priority assigned to the other PUCCH. As another example, UE 120 may determine that the first priority assigned to the multi-slot PUCCH is lesser relative to the second priority assigned to the other PUCCH, and may transmit the second communication (and may refrain from transmitting the first communication) in the one or more time slots (e.g., Slot 2 and Slot 3) based at least in part on determining that the first priority assigned to the multi-slot PUCCH is lesser relative to the second priority assigned to the other PUCCH. In this case, UE 120 may still transmit the multi-slot PUCCH in the slots (e.g., Slot 1 and Slot 4) in which the multi-slot PUCCH and the other PUCCH do not overlap.

In some aspects, UE 120 may determine that the first priority and the second priority are the same priority, and accordingly may determine whether to transmit the first communication or the second communication in the one or more time slots (e.g., Slot 2 and Slot 3) based at least in part on determining whether a starting time slot for the first communication occurs earlier in time relative to a starting time slot for the second communication and/or based at least in part on determining whether the starting time slot for the second communication occurs earlier in time relative to the starting time slot for the second communication. For example, and as shown in FIG. 7, UE 120 may determine that the first communication is scheduled to be first transmitted in Slot 1 and that the second communication is scheduled to be first transmitted in Slot 2. Accordingly, UE 120 may transmit the first communication (and may refrain from transmitting the second communication) in the one or more time slots (e.g., Slot 2 and Slot 3) based at least in part on determining that the starting time slot for the first communication occurs earlier in time relative to the starting time slot for the second communication.

Figure 8A:
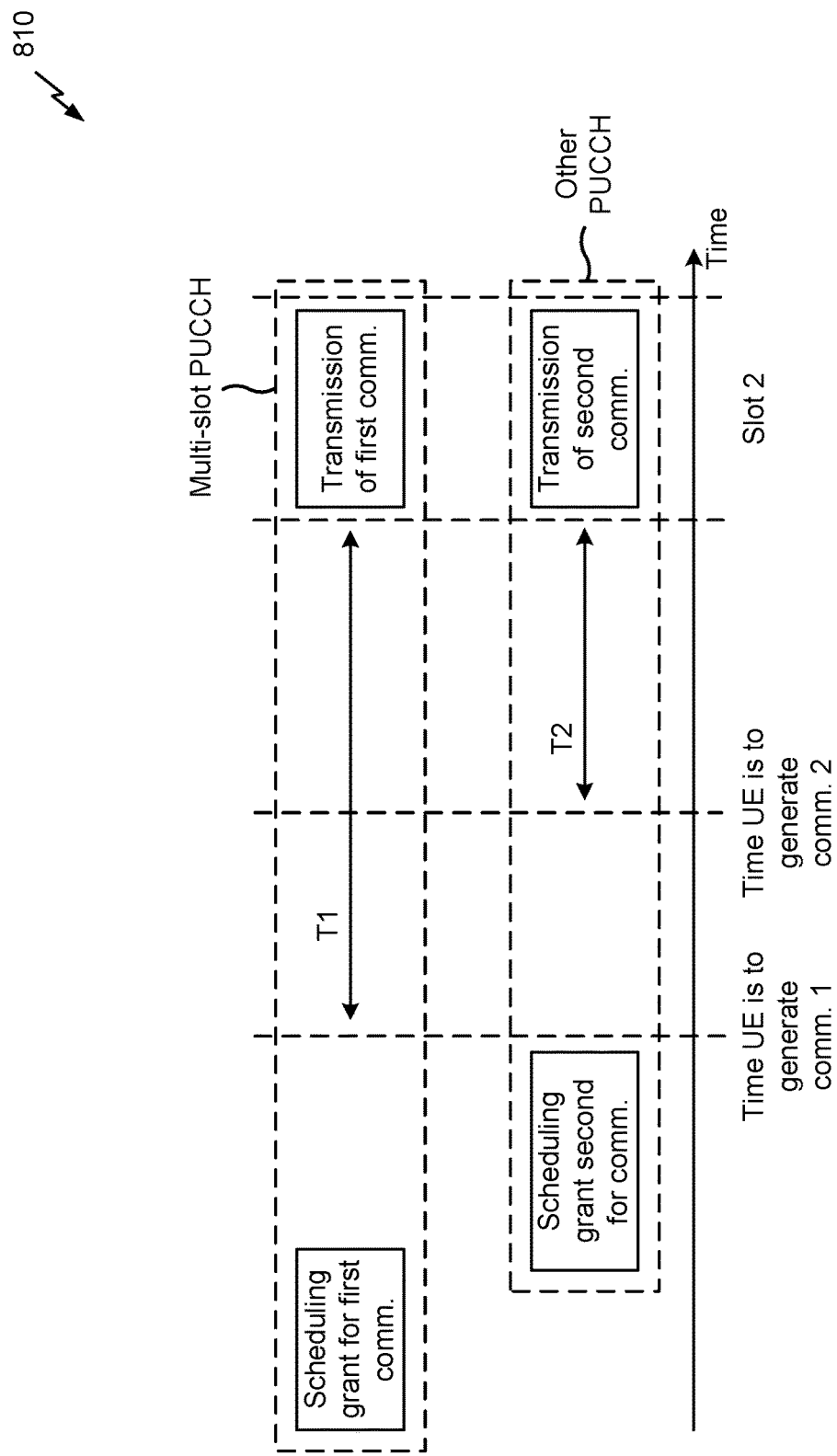
FIGS. 8A and 8B are diagrams illustrating an example of collision handling for physical uplink channel repetition, in accordance with various aspects of the present disclosure.
Figure 8B:
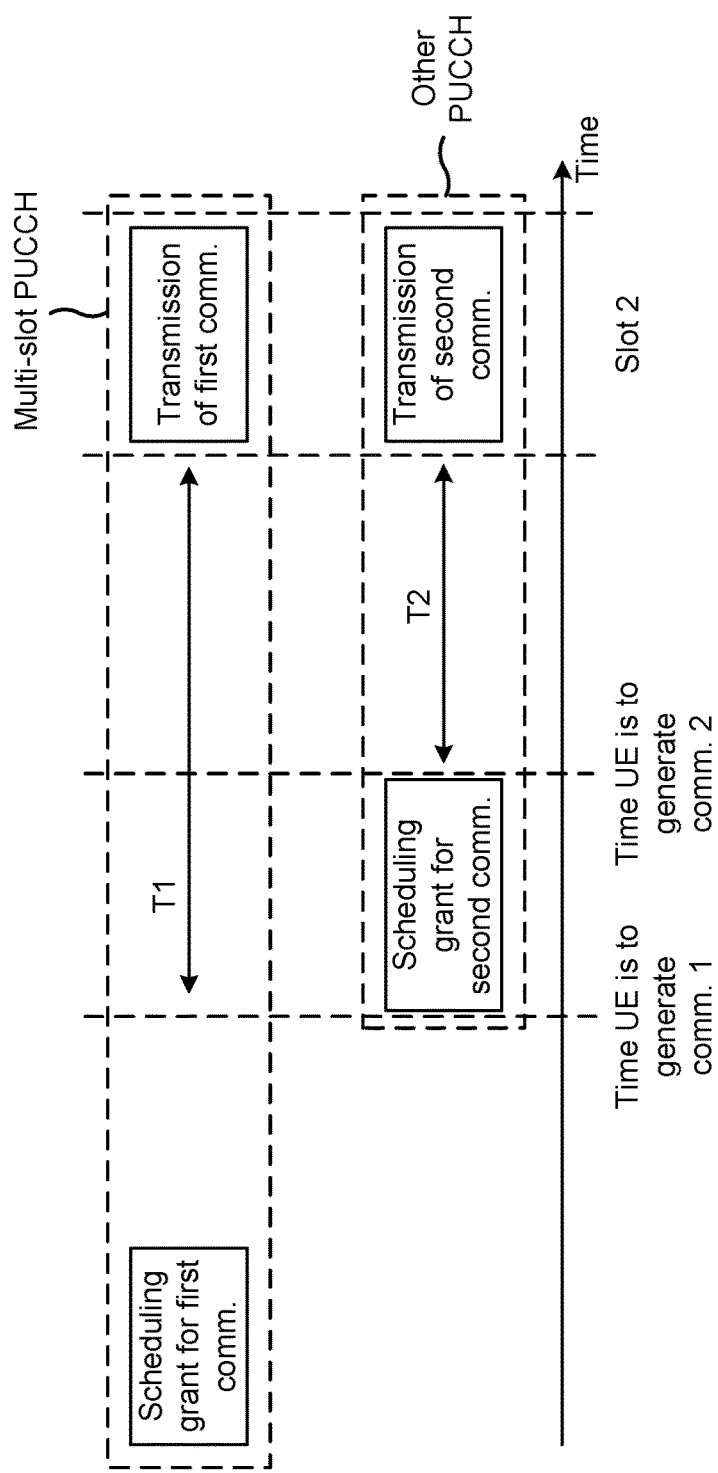

In some aspects, when determining whether to transmit the first communication or the second communication, UE 120 may determine that a scheduling error has occurred based on receiving scheduling grants for the first communication and the second communication. As shown in FIGS. 8A and 8B, which respectively illustrate example timelines 810 and 820, UE 120 may receive, at a first time, a first scheduling grant for transmitting the first communication on the multi-slot PUCCH in slot 2, and may receive, at a second time, a second scheduling grant for transmitting the second communication on the other PUCCH in slot 2. As shown in FIGS. 8A and 8B, UE 120 may initiate generating the first communication based at least in part on receiving the first scheduling grant for transmitting the first communication, and may initiate generating the second communication based at least in part on receiving the second scheduling grant for transmitting the second communication. In some aspects, UE 120 may generate the first transmission in an amount of time T1, and may generate the second communication in an amount of time T2. The amount of time UE 120 takes to generate the first communication (e.g., T1), and the amount of time UE 120 takes to generate the second communication (e.g., T2), may be a minimum amount of time required for the UE processing to generate the first and second communication, and T1 and T2 may be the same amount of time or different amounts of time.

As shown in FIG. 8A, and in example timeline 810, UE 120 may receive the first scheduling grant to transmit the first communication prior to the time at which UE 120 is to initiate generating the first communication and prior to the time at which UE 120 is to initiate generating the second communication, and may receive the second scheduling grant, to transmit the second communication, prior to the time at which UE 120 is to initiate generating the first communication and prior to the time at which UE 120 is to initiate generating the second communication. In this way, UE 120 may determine that no scheduling error has occurred, because UE 120 is capable of determining whether to transmit the first communication or the second communication prior to initiating the generation of the first communication and the second communication at the time which UE 120 is to generate the first communication and the second communication.

As shown in FIG. 8B, and in example timeline 820, UE 120 may receive the first scheduling grant to transmit the first communication prior to the time at which UE 120 is to initiate generating the first communication, and may receive the second scheduling grant, to transmit the second communication, prior to the time at which UE 120 is to initiate generating the second communication, but after the time at which UE 120 is to initiate generating the first communication. In this scenario, UE 120 may determine that a scheduling error has occurred because, if the second priority assigned to the other PUCCH is a greater priority relative to the first priority assigned to the multi-slot PUCCH, UE 120 may determine that UE 120 does not have enough time to determine to transmit the first communication (e.g., because UE 120 determines that the second priority is the greater priority at a time after the time at which UE 120 is to generate the first communication). Moreover, if the first priority assigned to the multi-slot PUCCH is a greater priority relative to the second priority assigned to the other PUCCH, UE 120 may determine that a scheduling error has occurred because BS 110 provided UE 120 with a scheduling grant (e.g., the second scheduling grant) that will not be used by UE 120 (e.g., which results in wasteful use of networking resources in the communications system). Accordingly, UE 120 may transmit a notification to BS 110 to adjust the scheduling for the multi-slot PUCCH and/or the other PUCCH in the one or more time slots.

In some aspects, UE 120 may determine whether a scheduling error has occurred on a per slot basis for the one or more slots with overlapping communications. For example, and referring back to FIG. 7, UE 120 may determine whether a scheduling error has occurred in each of Slot 2 and Slot 3. For example, UE 120 may determine that no scheduling error has occurred in Slot 3, and may determine that a scheduling error has occurred in Slot 2.

In this way, UE 120 is capable of resolving a collision between the multi-slot PUCCH and other PUCCHs (e.g., a single-slot PUCCH, another multi-slot PUCCH), which increases the reliability of UE 120, increases the operability of UE 120, and/or the like.

As indicated above, FIGS. 7, 8A, and 8B are provided as examples. Other examples may differ from what is described with respect to FIGS. 7, 8A, and 8B.

FIG. 9 is a diagram illustrating an example process 900 performed, for example, by a user equipment (UE), in accordance with various aspects of the present disclosure. Example process 900 is an example where a UE (e.g., UE 120) performs collision handling for physical uplink channel repetition.

As shown in FIG. 9, in some aspects, process 900 may include identifying one or more time slots in which a first communication on a multi-slot physical uplink control channel (PUCCH) overlaps with a second communication on another PUCCH (block 910). For example, the UE (e.g., using controller/processor 280, memory 282, and/or the like) may identify one or more time slots in which a first communication on a multi-slot physical uplink control channel (PUCCH) overlaps with a second communication on another PUCCH, as described above.

As shown in FIG. 9, in some aspects, process 900 may include transmitting, for each time slot of the one or more time slots, the first communication or the second communication based at least in part on a first priority assigned to the multi-slot PUCCH and a second priority assigned to the other PUCCH (block 920). For example, the UE (e.g., using transmit processors 264, controller/processor 280, memory 282, and/or the like) may transmit, for each time slot of the one or more time slots, the first communication or the second communication based at least in part on a first priority assigned to the multi-slot PUCCH and a second priority assigned to the other PUCCH, as described above.

Process 900 may include additional aspects, such as any single aspect or any combination of aspects described below and/or in connection with one or more other processes described elsewhere herein.

In a first aspect, the other PUCCH comprises at least one of a single-slot PUCCH or another multi-slot PUCCH. In a second aspect, alone or in combination with the first aspect, identifying the one or more time slots comprises identifying that the first communication and the second communication overlap, in each of the one or more time slots, by at least one orthogonal frequency division multiplexing (OFDM) symbol.

In a third aspect, alone or in combination with one or more of the first or second aspects, transmitting the first communication or the second communication comprises determining that the first priority assigned to the multi-slot PUCCH is the same as the second priority assigned to the other PUCCH, determining whether a starting time slot for the first communication occurs earlier in time relative to a starting time slot for the second communication, and transmitting the first communication or the second communication based at least in part on determining whether the starting time slot for the first communication occurs earlier in time relative to the starting time slot for the second communication.

In a fourth aspect, alone or in combination with one or more of the first through third aspects, transmitting the first communication or the second communication based at least in part on determining whether the starting time slot for the first communication occurs earlier in time relative to the starting time slot for the second communication comprises transmitting the second communication based at least in part on determining that the starting time slot for the second communication occurs earlier in time relative to the starting time slot for the first communication.

In a fifth aspect, alone or in combination with one or more of the first through fourth aspects, determining to transmit the first communication or the second communication based at least in part on determining whether the starting time slot for the first communication occurs earlier in time relative to the starting time slot for the second communication comprises transmitting the first communication based at least in part on determining that the starting time slot for the first communication occurs earlier in time relative to the starting time slot for the second communication.

In a sixth aspect, alone or in combination with one or more of the first through fifth aspects, determining to transmit the first communication or the second communication comprises determining that the first priority assigned to the multi-slot PUCCH is greater relative to the second priority assigned to the other PUCCH, and transmitting the first communication based at least in part on determining that the first priority assigned to the multi-slot PUCCH is greater relative to the second priority assigned to the other PUCCH. In a seventh aspect, alone or in combination with one or more of the first through sixth aspects, determining to transmit the first communication or the second communication comprises determining that the first priority assigned to the multi-slot PUCCH is lesser relative to the second priority assigned to the other PUCCH, and transmitting the second communication based at least in part on determining that the first priority assigned to the multi-slot PUCCH is lesser relative to the second priority assigned to the other PUCCH.

In an eighth aspect, alone or in combination with one or more of the first through seventh aspects, the first priority and the second priority are based at least in part on a UCI type associated with the multi-slot PUCCH and the other PUCCH, wherein the UCI type comprises at least one of a HARQ-ACK UCI type, an SR UCI type, or a CSI report UCI type.

In a ninth aspect, alone or in combination with one or more of the first through eighth aspects, the HARQ-ACK UCI type is a greater priority relative to the SR UCI type and the CSI report UCI type, and wherein the SR UCI type is a greater priority relative to the CSI report UCI type. In a tenth aspect, alone or in combination with one or more of the first through ninth aspects, the first priority and the second priority are based at least in part on a first CSI report priority assigned to the multi-slot PUCCH and a second CSI report priority assigned to the other PUCCH.

In an eleventh aspect, alone or in combination with one or more of the first through tenth aspects, the first priority and the second priority are based at least in part on a service type associated with the multi-slot PUCCH and the other PUCCH, wherein the service type comprises at least one of a URLLC service type, an eMBB service type, or an MMTC service type. In a twelfth aspect, alone or in combination with one or more of the first through eleventh aspects, the URLLC service type is a greater priority relative to the eMBB service type. In a thirteenth aspect, alone or in combination with one or more of the first through twelfth aspects, process 900 further comprises transmitting the first communication on the multi-slot PUCCH in one or more other time slots in which the first communication and the second communication do not overlap.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
identifying one or more time slots in which a first communication with a first service type and a first uplink control information (UCI) type on multi-slot physical uplink control channel (PUCCH) overlaps with a second communication with a second service type and a second UCI type on another PUCCH; and transmitting, for each time slot of the one or more time slots, the first communication or the second communication based at least in part on a first priority assigned to the first communication of the multi-slot PUCCH and a second priority assigned to the second communication of the other PUCCH, wherein the first priority and second priority are firstly based on a service type and secondly based on a UCI type when the first service type and the second service type are the same, for determining a transmission of the first communication on the multi-slot PUCCH or the second communication on the other PUCCH and wherein an ultra reliable low latency communications (URLLC) service type has a greater priority relative to an enhanced mobile broadband (eMBB) service type and a hybrid automatic repeat request acknowledgement (HARQ-ACK) UCI type has a greater priority relative to a scheduling request (SR) UCI type; and wherein when the first service type is the same as the second service type and the first UCI type is the same as the second UCI type, the method further comprises:

determining whether a starting time slot for the first communication occurs earlier in time relative to a starting time slot for the second communication; and transmitting the first communication or the second communication basea at least in part on determining whether the starting time slot for the first communication occurs earlier in time relative to the starting time slot for the second communication.

2. The method of claim 1, wherein the other PUCCH comprises:
a single-slot PUCCH, or
another multi-slot PUCCH.

3. The method of claim 1, wherein identifying the one or more time slots comprises:
identifying that the first communication and the second communication overlap, in each of the one or more time slots, by at least one orthogonal frequency division multiplexing (OFDM) symbol.

4. The method of claim 1, wherein transmitting the first communication or the second communication based at least in part on determining whether the starting time slot for the first communication occurs earlier in time relative to the starting time slot for the second communication comprises:
transmitting the second communication based at least in part on determining that the starting time slot for the second communication occurs earlier in time relative to the starting time slot for the first communication.

5. The method of claim 1, wherein transmitting the first communication or the second communication based at least in part on determining whether the starting time slot for the first communication occurs earlier in time relative to the starting time slot for the second communication comprises:
transmitting the first communication based at least in part on determining that the starting time slot for the first communication occurs earlier in time relative to the starting time slot for the second communication.

6. The method of claim 1, wherein transmitting the first communication or the second communication comprises:
determining that the first priority assigned to the multi-slot PUCCH is greater relative to the second priority assigned to the other PUCCH; and
transmitting the first communication based at least in part on determining that the first priority assigned to the multi-slot PUCCH is greater relative to the second priority assigned to the other PUCCH.

7. The method of claim 1, wherein transmitting the first communication or the second communication comprises:
determining that the first priority assigned to the multi-slot PUCCH is lesser relative to the second priority assigned to the other PUCCH; and
transmitting the second communication based at least in part on determining that the first priority assigned to the multi-slot PUCCH is lesser relative to the second priority assigned to the other PUCCH.

8. The method of claim 1, wherein the first priority and the second priority are based at least in part on:
The UCI type associated with the multi-slot PUCCH and the other PUCCH,
wherein the first UCI type or the second UCI type comprises at least one of:
the HARQ-ACK UCI type,
the UCI type, or
a channel state information (CSI) report UCI type.

9. The method of claim 8, wherein the SR UCI type is a greater priority relative to the CSI report UCI type.

10. The method of claim 1, wherein the first priority and the second priority are based at least in part on:
a first channel state information (CSI) report priority assigned to the multi-slot PUCCH; and
a second CSI report priority assigned to the other PUCCH.

11. The method of claim 1, further comprising:
transmitting the first communication on the multi-slot PUCCH in one or more other time slots in which the first communication and the second communication do not overlap.

12. A user equipment (UE) for wireless communication, comprising:
a memory; and
one or more processors operatively coupled to the memory, the memory and the one or more processors configured to:
identify one or more time slots in which a first communication with a first service type and a first uplink control information (UCI) type on multi-slot physical uplink control channel (PUCCH) overlaps with a second communication with a second service type and a second UCI type on another PUCCH; and
transmit, for each time slot of the one or more time slots, the first communication or the second communication based at least in part on a first priority assigned to the first communication of the multi-slot PUCCH and a second priority assigned to the second communication of the other PUCCH, wherein the first priority and second priority are firstly based on a service type and secondly based on a UCI type when the first service type and the second service type are the same, for determining a transmission of the first communication on the multi-slot PUCCH or the second communication on the other PUCCH and wherein an ultra reliable low latency communications (URLLC) service type has a greater priority relative to an enhanced mobile broadband (eMBB) service type and a hybrid automatic repeat request acknowledgement (HARQ-ACK) UCI type has a greater priority relative to a scheduling request (SR) UCI type; and
wherein when the first service type is the same as the second service type and the first UCI type is the same as the second UCI type, the one or more processors is further configured to determine whether a starting time slot for the first communication occurs earlier in time relative to a starting time slot for the second communication; and transmit the first communication or the second communication based at least in part on determining whether the starting time slot for the first communication occurs earlier in time relative to the starting time slot for the second communication.

13. The UE of claim 5, wherein transmitting the first communication or the second communication based at least in part on determining whether the starting time slot for the first communication occurs earlier in time relative to the starting time slot for the second communication comprises:
transmit the second communication based at least in part on determining that the starting time slot for the second communication occurs earlier in time relative to the starting time slot for the first communication.

14. The UE of claim 12, wherein transmitting the first communication or the second communication based at least in part on determining whether the starting time slot for the first communication occurs earlier in time relative to the starting time slot for the second communication comprises:
transmit the first communication based at least in part on determining that the starting time slot for the first communication occurs earlier in time relative to the starting time slot for the second communication.

15. The UE of claim 12, wherein transmitting the first communication or the second communication comprises:
determine that the first priority assigned to the multi-slot PUCCH is greater relative to the second priority assigned to the other PUCCH; and
transmit the first communication based at least in part on determining that the first priority assigned to the multi-slot PUCCH is greater relative to the second priority assigned to the other PUCCH.

16. The UE of claim 12, wherein transmitting the first communication or the second communication comprises:
determine that the first priority assigned to the multi-slot PUCCH is lesser relative to the second priority assigned to the other PUCCH; and
transmit the second communication based at least in part on determining that the first priority assigned to the multi-slot PUCCH is lesser relative to the second priority assigned to the other PUCCH.

17. The UE of claim 12, wherein the first priority and the second priority are based at least in part on:
a first channel state information (CSI) report priority assigned to the multi-slot PUCCH; and
a second CSI report priority assigned to the other PUCCH.

18. The UE of claim 12, wherein the one or more processors are further configured to:
transmit the first communication on the multi-slot PUCCH in one or more other time slots in which the first communication and the second communication do not overlap.

19. A non-transitory computer-readable medium storing one or more instructions for wireless communication, the one or more instructions comprising:
one or more instructions that, when executed by one or more processors of a user equipment (UE), cause the one or more processors to:
identify one or more time slots in which a first communication with a first service type and a first uplink control information (UCI) type on multi-slot physical uplink control channel (PUCCH) overlaps with a second communication with a second service type and a second UCI type on another PUCCH; and
transmit, for each time slot of the one or more time slots, the first communication or the second communication based at least in part on a first priority assigned to the first communication of the multi-slot PUCCH and a second priority assigned to the second communication of the other PUCCH, wherein the first priority and second priority are firstly based on a service type and secondly based on a UCI type when the first service type and the second service type are the same, for determining a transmission of the first communication on the multi-slot PUCCH or the second communication on the other PUCCH and wherein an ultra reliable low latency communications (URLLC) service type has a greater priority relative to an enhanced mobile broadband (eMBB) service type and a hybrid automatic repeat request acknowledgement (HARQ-ACK) UCI type has a greater priority relative to a scheduling request (SR) UCI type; and
wherein when the first service type is the same as the second service type and the first UCI type is the same as the second UCI type, the one or more instructions further cause the one or more processors to:
determine whether a starting time slot for the first communication occurs earlier in time relative to a starting time slot for the second communication; and
transmit the first communication or the second communication based at least in part on determining whether the starting time slot for the first communication occurs earlier in time relative to the starting time slot for the second communication.

20. The non-transitory computer-readable medium of claim 19, wherein transmitting the first communication or the second communication comprises:
determine that the first priority assigned to the multi-slot PUCCH is greater relative to the second priority assigned to the other PUCCH; and
transmit the first communication based at least in part on determining that the first priority assigned to the multi-slot PUCCH is greater relative to the second priority assigned to the other PUCCH.

21. The non-transitory computer-readable medium of claim 19, wherein the first priority and the second priority are based at least in part on:
a first channel state information (CSI) report priority assigned to the multi-slot PUCCH; and
a second CSI report priority assigned to the other PUCCH.

22. An apparatus for wireless communication, comprising:
means for identifying one or more time slots in which a first communication with a first service type and a first uplink control information (UCI) type on multi-slot physical uplink control channel (PUCCH) overlaps with a second communication with a second service type and a second UCI type on another PUCCH; and
means for transmitting, for each time slot of the one or more time slots, the first communication or the second communication based at least in part on a first priority assigned to the first communication of the multi-slot PUCCH and a second priority assigned to the second communication of the other PUCCH, wherein the first priority and second priority are firstly based on a service type and secondly based on a UCI type when the first service type and the second service type are the same, for determining a transmission of the first communication on the multi-slot PUCCH or the second communication on the other PUCCH and wherein an ultra reliable low latency communications (URLLC) service type has a greater priority relative to an enhanced mobile broadband (eMBB) service type and a hybrid automatic repeat request acknowledgement (HARQ-ACK) UCI type has a greater priority relative to a scheduling request (SR) UCI type, and wherein when the first service type is the same as the second service type and the first UCI type is the same as the second UCI type, the one or more instructions further cause the one or more processors to:

determine whether a starting time slot for the first communication occurs earlier in time relative to a starting time slot for the second communication; and transmit the first communication or the second communication based at least in part on determining whether the starting time slot for the first communication occurs earlier in time relative to the starting time slot for the second communication.

23. The apparatus of claim 22, wherein the means for transmitting the first communication or the second communication comprises:

means for determining that the first priority assigned to the multi-slot PUCCH is greater relative to the second priority assigned to the other PUCCH; and means for transmitting the first communication based at least in part on determining that the first priority assigned to the multi-slot PUCCH is greater relative to the second priority assigned to the other PUCCH.

* * * * *